Patented Sept. 12, 1950

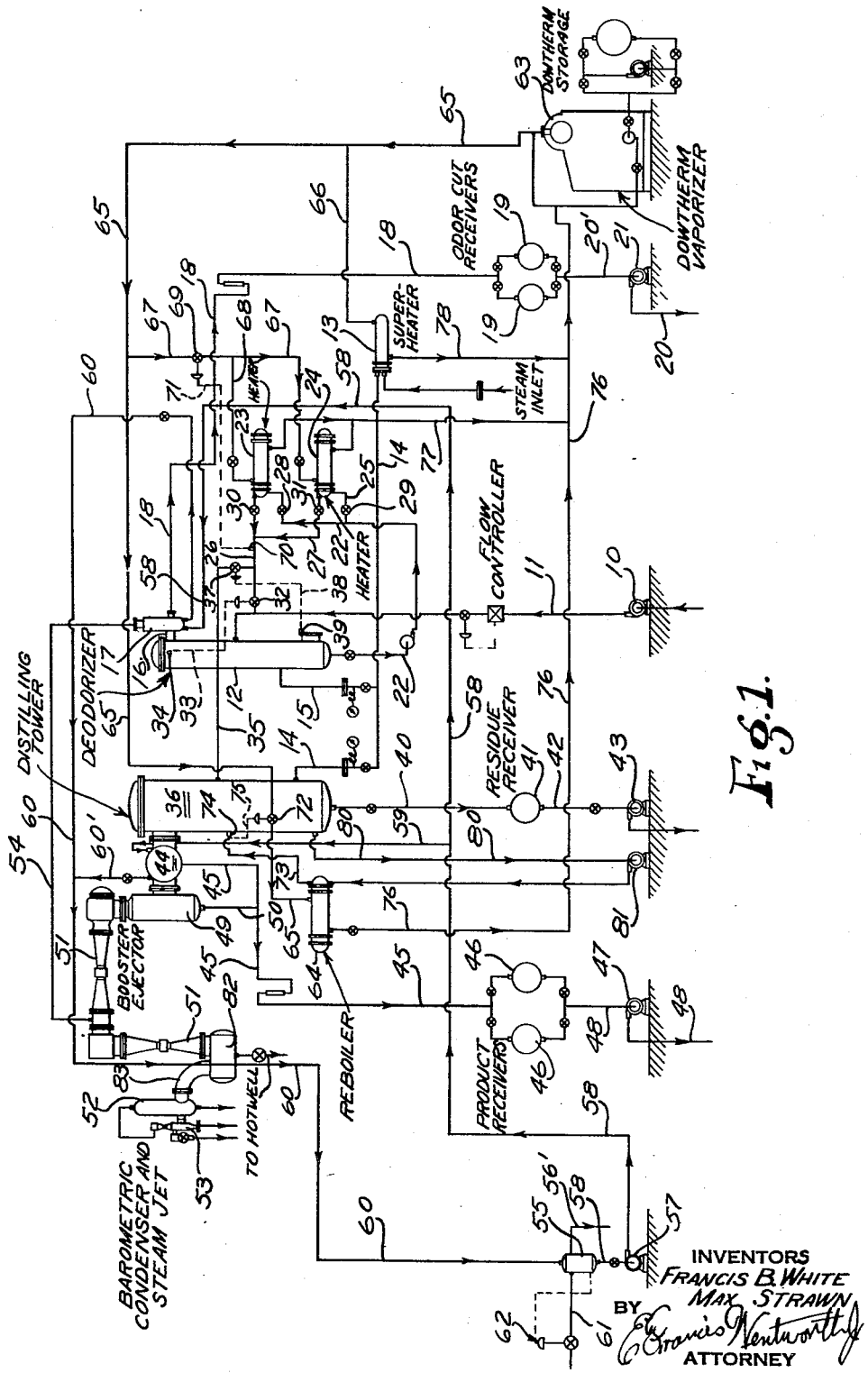

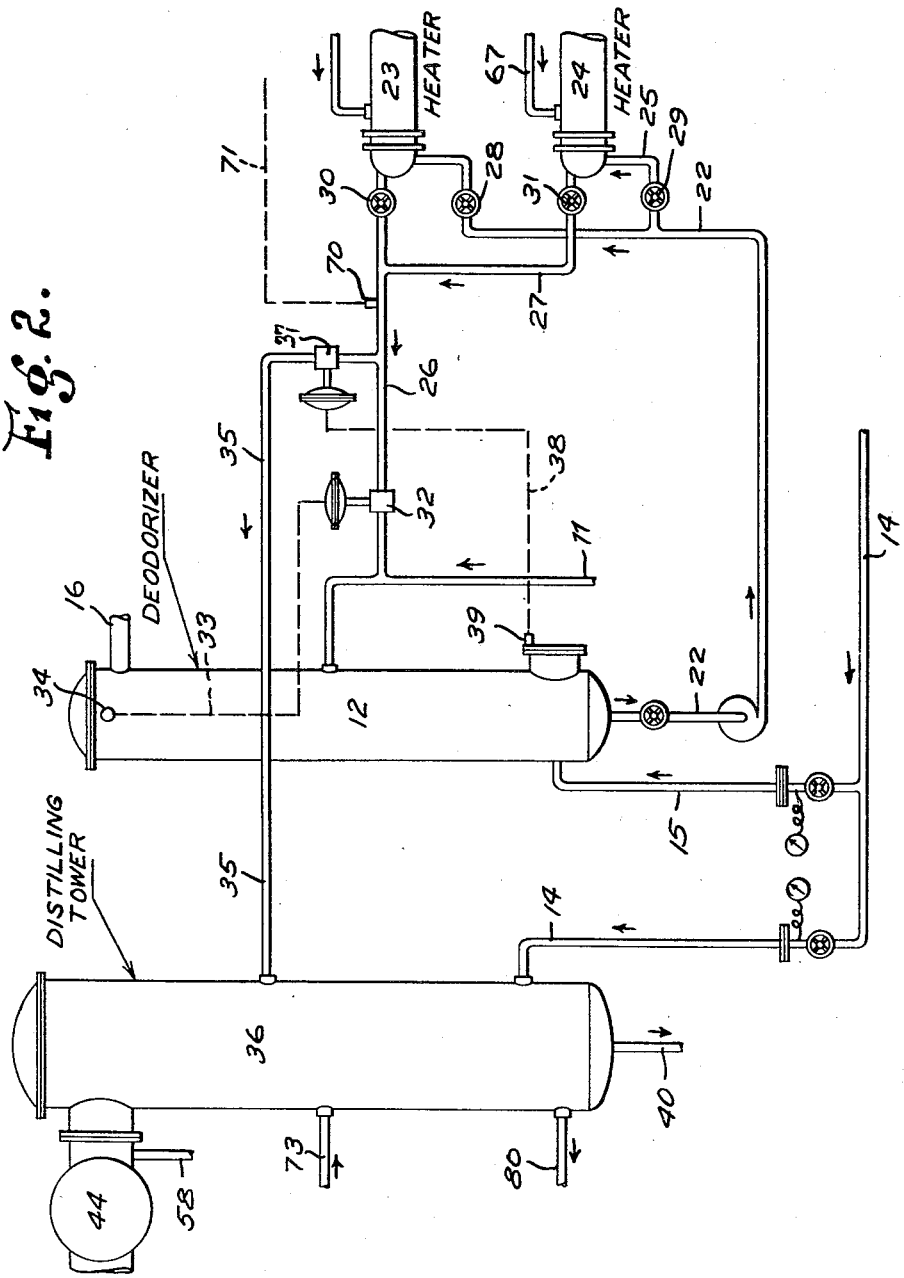

2,521,766

UNITED STATES PATENT OFFICE 2,521,766

METHOD OF AND APPARATUS FOR DISTILLATION OF STOCK CONTAINING FATTY ACIDS AND THE LIKE

Francis B. White, Elmhurst, N. Y., and Max Strawn, Paterson, N. J., assignors to Foster Wheeler Corporation, New York, N. Y., a corporation of New York Application November 27, 1946, Serial No. 712,624

11 Claims. (Cl. 202—47)

This invention relates to the treatment of stock containing fatty acids or the like and more particularly to a method of and apparatus for the distillation thereof.

In the treatment of stocks containing fatty acid or the like in apparatus and by a method of the general type set forth in the co-pending application of one of the present inventors, Francis B. White, Serial No. 712,613, filed concurrently herewith, undesirables such as low boiling, odoriferous and color bearing materials are removed from the feed stock in a deodorizing tower wherein said feed stock flows in contact with steam thereby stripping the undesirables therefrom. The stripped feed stock is then passed to the bulk overhead distillation tower. The deodorization tower normally operates at a lower temperature than the bulk overhead distilling tower. Under these conditions it would ordinarily be necessary to employ two heating units, one to raise the feed stock to the temperature required by the deodorizing tower and the second to bring the deodorized stock from the deodorizing tower to the higher temperature required by the bulk overhead distilling tower.

The present invention provides a method of and apparatus for the treatment of stock containing fatty acids or the like wherein the undesirables are eliminated at one temperature from the feed stock prior to passage thereof to the bulk overhead distilling tower and the feed stock is distilled in said bulk overhead distilling tower at a temperature higher than said one temperature, one heating unit or a single heating step being required in said method and apparatus for the heating of the feed stock for deodorizing and finally distilling the same.

This invention also provides a method of and apparatus for the treatment of stock containing fatty acids or the like wherein feed stock is introduced directly into the deodorizing tower instead of into a heater.

The invention will be understood from the following description when considered in connection with the accompanying drawings forming a part thereof in which:

Fig. 1 is a flow diagram of the apparatus of the present invention for the treatment of fatty acids, fatty oils and the like, and Fig. 2 is a view of a portion of Fig. 1 but on an enlarged scale.

Referring to the drawing, fatty acid feed stock is pumped from storage by pump 10 into feed line 11 which is connected at one end thereof to a deodorizing or distilling tower 12 intermediate the opposite ends of said tower. Steam from superheater 13 is passed into the lower portion of tower 12 through lines 14 and 15. In the tower 12, the steam and feed stock flow countercurrent to and in contact with each other. Passage of the steam and feed stock in contact with one another causes the low boiling constituents, which includes odoriferous and color bearing materials, to vaporize. This vapor passes from the shell at the top thereof through a pipe 16 into an odor cut condenser 17 wherein they are condensed, the condensate passing from the condenser 17 through line 18 into odor cut receivers 19 thereafter to be pumped to storage through line 20 by pump 21 which is in communication with the receivers 19 through line 20'.

The deodorized feed stock is pumped from the tower 12 through conduit 22 into heater 23 or into heater 24 from conduit 22 through line 25. Heated stock flows from heater 23 through outlet conduit 26 while heated stock from heater 24 is passed into outlet conduit 26 through line 27. Conduit 22, line 25, conduit 26 and line 27 are controlled by valves 28, 29, 30 and 31 respectively so that deodorized feed stock may be delivered to either the heater 23 or the heater 24.

Either heater 23 or heater 24 acts as a single heating unit for bringing the feed stock to the temperature required for distilling the deodorized feed stock in the distilling tower and also to a desired lower temperature for removing in the deodorizer relatively low boiling undesirables from the feed stock. To this end, a portion of the heated deodorized feed stock is caused to mix with the raw feed stock prior to passage thereof to the deodorizing tower thereby heating said raw feed stock. As shown, conduit 26 is connected at one end thereof to feed line 11 at a point prior to the connection of the feed line 11 to the deodorizing tower 12 so that a portion of the heated deodorized feed stock from the heaters 23 or 24 will flow into the feed line 11, mix with the feed stock flowing to the deodorizing tower and heat the same. The temperature to which the feed stock flowing into the deodorizer 12 is heated is controlled by controlling the quantity of heated deodorized feed stock mixed therewith. The quantity of heated feed stock flowing into line 11 is controlled by thermostatically controlled valve 32 which, as shown, is responsive to the temperature adjacent the top of tower 12 through line 33 and element 34. The other portion of the heated deodorized feed stock from heater 23 or heater 24 is passed from conduit 26 through conduit 35 into bulk overhead distilling tower 36. The flow in line 35 is controlled by liquid level control valve 37 which maintains a constant liquid level in the base of the deodorizing tower 12 through line 38 and element 39.

Heated deodorized stock in line 35 passes into distilling tower 36 intermediate the opposite ends thereof while steam from the superheater 13 flows into said distilling tower adjacent the bottom thereof through line 14. In the distilling tower 36, the deodorized stock and the steam flow countercurrent to and in contact with each other, the residue flowing from the tower at the bottom thereof through line 40 into a residue receiver 41 whence it is passed to storage through conduit 42 and pump 43. A portion of the residue is recycled from tower 36 through line 80 by recycle pump 81 which passes the residue into reboiler 64 wherein it is heated and the resulting fluid passed to tower 36 through line 73. The vapor in the distilling tower flows therefrom adjacent the top thereof into a main condenser 44 wherein the major portion is condensed, the condensate or product flowing from the main condenser through line 45 into product receivers 46 whence it is pumped by pump 47 through lines 48 to storage. The uncondensed vapors pass from the main condenser 44 into a catch-all 49 where entrained liquids are removed, the liquid product flowing therefrom through line 50 into line 45 thence into product receivers 46.

Catch-all 49 communicates with a two stage booster ejector 51 which in turn is in communication with a separator 82. The separator 82 is connected to barometric condenser 52 by a pipe 83, the condenser 52 being acted upon by two stage steam jet 53. Vacuum is maintained in the condenser 17 through line 54, while a condensing medium which, as shown, is tempered water from a circulating tank 55, is pumped into odor cut condenser 17 by pump 57 through line 58 and to condenser 44 through lines 58 and 59. The condensing medium passes from the odor cut condenser 17 and main condenser 44 through lines 60 and 60'. The line 60' is connected to line 60 which in turn is connected to tank 55 thereby returning the heated medium to said tank. An inlet conduit 61 controlled by a thermostatic valve 62 responsive to the temperature in tank 55 is connected to tank 55 so that sufficient cool water may be added to the system to maintain the proper temperature therein. Excess water overflows from tank 55 through line 56'.

As shown, a heating medium for the heater unit comprising heaters 23 and 24, for the superheater 13, and for the reboiler 64, is provided by a Dowtherm vaporizer 63. The vapor from vaporizer 63 flows through line 65 into the reboiler 64 and also into line 66. From line 66 the vapor flows to the superheater 13 and from line 65 through conduit 67 into heater 24. Vapor from line 67 also passes through line 68 into heater 23. The temperature to which deodorized feed stock is heated in heater 23 or 24 is controlled by a thermostatically controlled valve 69 responsive through element 70 and line 71 to the temperature of the heated deodorized feed stock flowing in line 26. The temperature to which the recycled residue is heated in the reboiler is controlled by a thermostatically controlled valve 72 responsive through line 75 and element 74 to temperature in return line 73 from the reboiler. After use in the reboiler 64, the Dowtherm is returned to vaporizer 63 through line 76 and after use in heaters 23 and 24 and superheater 13 the Dowtherm is returned to the vaporizer through return lines 77 and 78, respectively, which lines communicate with line 76.

In operation, feed stock is passed into deodorizer 12 through feed line 11, the low boiling undesirables being removed from the feed stock in the deodorizer tower by passage of steam countercurrent to or in contact therewith. The feed stock is heated to the desired temperature prior to introduction into the deodorizer by mixing therewith a portion of the deodorized feed stock heated in the heating unit comprising heaters 23 and 24 to the proper temperature for distillation thereof in tower 36, which temperature is substantially higher than that required in the deodorizer. The temperature of the deodorized feed stock in lines 26 and 27 is maintained at the temperature required by the distilling tower 36 while the lower temperature required by the deodorizer 12 is maintained by mixing a portion of the feed stock from line 26 with feed stock flowing to the deodorizer through line 11.

It will be noted that in the hereinbefore described process fractionation is not required to remove the low boiling undesirables from the fatty acid feed stock. These undesirables are vaporized in a continuous deodorizer involving simple distillation, the vapors containing said undesirables passing from the deodorizer, while the deodorized stock is passed to a distilling tower, wherein the final step of the distillation process is carried out at a higher temperature than that required in the deodorizer.

Inasmuch as changes may be made in the form, location and relative arrangement of the several parts of the invention and in the sequence of the various method steps without departing from the principles of the invention, it will be understood that the invention is not to be limited excepting by the scope of the appended claims.

What is claimed is:

1. A process of obtaining fatty acids, or like product from stock containing the same which comprises flowing said stock into a stripping zone, stripping undesirables from the stock in the stripping zone, heating the stripped stock in a heating zone, heating the stock solely by introducing a portion of the heated stripped stock thereinto prior to flowing said stock into said stripping zone, and passing another portion of the heated stripped stock from the heating zone into a zone wherein the product is separated from said stock.

2. A process of obtaining fatty acids, fatty oils or the like from stock containing the same which comprises flowing said stock into a distilling zone, vaporizing undesirable materials in said distilling zone to remove them from the stock, heating the unvaporized stock from the distilling zone in a heating zone, heating the stock solely by introducing a portion of the heated unvaporized stock from the heating zone thereinto prior to flowing the stock into said distilling zone, and passing another portion of the heated unvaporized stock from the heating zone into a zone wherein the product is separated from said stock.

3. A process of obtaining fatty acids, fatty oils or the like from stock containing the same which comprises flowing said stock into a distilling zone, vaporizing undesirable materials in said distilling zone to remove them from the stock, heating the unvaporized stock from the distilling zone in a heating zone, heating the stock solely by introducing a portion of the heated unvaporized stock from the heating zone thereinto prior to flowing the stock into said distilling zone, and passing another portion of the heated unvaporized stock from the heating zone into a second distilling zone wherein said fatty acids or the like are separated from components in the stock having higher boiling points.

4. A process of obtaining fatty acids, fatty oils or the like from stock containing the same which comprises flowing said stock into a distilling zone, vaporizing in the distilling zone odoriferous and color bearing materials in the stock, heating the unvaporized stock from the distilling zone in a heating zone, heating the stock solely by introducing a portion of the heated unvaporized stock from the heating zone thereinto prior to flowing the stock into said distilling zone, and passing another portion of the heated unvaporized stock from the heating zone into a zone wherein the product is separated from said stock.

5. A process of obtaining fatty acids, fatty oils or the like from stock containing the same which comprises flowing said stock into a distilling zone, vaporizing in the distilling zone odoriferous and color bearing materials in the stock, heating the unvaporized stock from the distilling zone in a heating zone, heating the stock solely by introducing a portion of the heated unvaporized stock from the heating zone thereinto prior to flowing the stock into said distilling zone, and passing another portion of the heated unvaporized stock from the heating zone into a second distilling zone wherein said fatty acids or the like are separated from components in the stock having higher boiling points.

6. A process of obtaining fatty acids, fatty oils or the like from stock containing the same which comprises flowing said stock into a distilling zone, vaporizing undesirable materials in said distilling zone to remove them from the stock, heating the unvaporized stock from the distilling zone in a heating zone, heating the stock solely by introducing a portion of the heated unvaporized stock from the heating zone thereinto prior to flowing the stock into said distilling zone, and passing another portion of the heated unvaporized stock from the heating zone into a second distilling zone wherein said fatty acids or the like are separated from components in the stock having higher boiling points, the unvaporized stock from the distilling zone being heated in the heating zone to the temperature required for the second distilling zone.

7. A process of obtaining fatty acids, fatty oils or the like from stock containing the same which comprises flowing said stock into a distilling zone, vaporizing in the distilling zone odoriferous and color bearing materials in the stock, heating the unvaporized stock from the distilling zone in a heating zone, heating the stock to the temperature required by said distilling solely by introducing a portion of the heated unvaporized stock from the heating zone thereinto prior to flowing the stock into said distilling zone, and passing another portion of the heated unvaporized stock from the heating zone into a second distilling zone wherein said fatty acids or the like are separated from components in the stock having higher boiling points, the unvaporized stock from the distilling zone being heated in the heating zone to the temperature required for the second distilling zone.

8. A process of obtaining fatty acids, fatty oils or the like from stock containing the same which comprises flowing said stock into a distilling zone, flowing said stock countercurrent to and in contact with steam in a distilling zone to thereby remove odoriferous and color bearing materials from the stock, heating the stock to the temperature required by said distilling zone solely by introducing a portion of the heated unvaporized stock from the heating zone thereinto prior to flowing the stock into said distilling zone, and flowing another portion of the heated unvaporized stock from the heating zone countercurrent to and in contact with steam in a second distilling zone to thereby vaporize fatty acids or the like and separate them from the residue of the stock, the unvaporized stock from the distilling zone being heated in said heating zone to the temperature required for the second distilling zone.

9. In apparatus for treating stock containing fatty acid, fatty oil or the like, a distilling tower, means through which steam is introduced into the lower part of the tower, conduit means through which said stock is conducted to the tower at a point above the point of introduction of the steam, said tower being so constructed and arranged that the steam and said stock flow countercurrent to and in contact with one another therein the stock being heated thereby to such temperature that undesirable materials in said stock are vaporized, a second distilling tower, means for conducting steam to the lower portion of said second tower, a heater, means for conducting unvaporized stock from the first-mentioned distilling tower to the heater, the heater being adapted to heat the unvaporized stock to such temperature that fatty acids or the like will be vaporized in said second distilling tower, means for conducting heated stock from the heater to a point in said second tower above the point of introduction of the steam thereinto, the second tower being so constructed and arranged that the steam and said heated stock flow countercurrent and in contact with one another therein, pipe means in communication with said heater and with said conduit means at a position prior to the point of communication of said conduit with the tower and through which heated stock from the heater is conducted into the conduit means, and control means for controlling the amount of heated stock passing into said conduit means to thereby control the temperature of the stock passing into said first-mentioned tower so that said undesirable materials only will be vaporized therein.

10. In apparatus for treating stock containing fatty acid, fatty oil or the like, a distilling tower, means through which steam is introduced into the lower part of the tower, conduit means through which said stock is conducted to the tower at a point above the point of introduction of the steam, said tower being so constructed and arranged that the steam and said stock flow countercurrent to and in contact with one another therein, the stock being heated thereby to such temperature that odoriferous and color bearing materials in the stock are vaporized, a second distilling tower, means for conducting steam to the lower portion of said second tower, a heater, means for conducting unvaporized stock from the first-mentioned distilling tower to the heater, the heater being adapted to heat the unvaporized stock to such temperature that fatty acids or the like will be vaporized in said second distilling tower, means for conducting heated stock from the heater to a point in said second tower above the point of introduction of the steam thereinto, the second tower being so constructed and arranged that the steam and said heated stock flow countercurrent and in contact with one another therein, pipe means in communication with said heater and with said conduit means at a position prior to the point of communication of said conduit with the tower and through which heated stock from the heater is conducted into said conduit means, and control means for controlling the amount of heated stock passing into said conduit means to thereby control the temperature of the stock passing into said first-mentioned tower so that said odoriferous and color bearing materials only will be vaporized therein.

11. In apparatus for treating stock containing fatty acid, fatty oil or the like, a distilling tower, means through which steam is introduced into the lower part of the tower, conduit means through which said stock is conducted to the tower at a point above the point of introduction of the steam, said tower being so constructed and arranged that the steam and said stock flow countercurrent to and in contact with one another therein, the stock being heated thereby to such temperature that odoriferous and color bearing materials in the stock are vaporized, a second distilling tower, means for conducting steam to the lower portion of said second tower, a heater, means for conducting unvaporized stock from the first-mentioned distilling tower to the heater, the heater being adapted to heat the unvaporized stock to such temperature that fatty acids or the like will be vaporized in said second distilling tower, means for conducting heated stock from the heater to a point in said second tower above the point of introduction of the steam thereinto, the second tower being so constructed and arranged that the steam and said heated stock flow countercurrent and in contact with one another therein, pipe means in communication with said heater and with said conduit means at a position prior to the point of communication of said conduit with the tower and through which heated stock from the heater is conducted into said conduit means, and control means responsive to the temperature in said first-mentioned distilling tower for controlling the amount of heated stock passing into said conduit means to thereby control the temperature of the stock passing into said first-mentioned tower so that said odoriferous and color bearing materials only will be vaporized therein.

FRANCIS B. WHITE.
MAX STRAWN.

REFERENCES CITED

The following references are of record in the file of this patent:

UNITED STATES PATENTS

| Number | Name | Date |
|---|---|---|
| 2,054,096 | Potts | Sept. 15, 1936 |
| 2,224,925 | Potts | Dec. 17, 1940 |
| 2,322,056 | Potts | June 15, 1943 |
| 2,357,829 | Ittner | Sept. 12, 1944 |
| 2,361,411 | Murphy | Oct. 31, 1944 |
| 2,368,669 | Lee et al. | Feb. 6, 1945 |